United States Patent [19]
Evans et al.

[11] Patent Number: 6,136,079
[45] Date of Patent: Oct. 24, 2000

[54] DYE FOR INK JET INK

[75] Inventors: Steven Evans, Rochester; Helmut Weber, Webster, both of N.Y.

[73] Assignee: Eastman Kodak Company, Rochester, N.Y.

[21] Appl. No.: 09/303,523

[22] Filed: Apr. 30, 1999

[51] Int. Cl.$^7$ ...................................................... C09D 11/00
[52] U.S. Cl. .................................... 106/31.27; 106/31.49; 106/31.58
[58] Field of Search .............................. 106/31.27, 31.58, 106/31.49

[56] References Cited

U.S. PATENT DOCUMENTS

| | | |
|---|---|---|
| 4,770,984 | 9/1988 | Ailliet et al. . |
| 5,723,272 | 3/1998 | Barber et al. . |
| 5,810,916 | 9/1998 | Gundlach et al. . |
| 5,851,274 | 12/1998 | Lin . |
| 5,932,631 | 8/1999 | Marritt et al. ........................ 106/31.27 |

FOREIGN PATENT DOCUMENTS 0 802 065 A2  4/1997  European Pat. Off. .

*Primary Examiner*—Mark L. Bell
*Assistant Examiner*—Veronica F. Faison
*Attorney, Agent, or Firm*—Harold E. Cole

[57] ABSTRACT

An ink jet ink composition comprising water, a humectant and a water-soluble monomethine oxonol dye.

6 Claims, No Drawings

DYE FOR INK JET INK

FIELD OF THE INVENTION

This invention relates to an oxonol dye useful as a colorant in an ink jet ink composition.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength (λ-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes, particularly yellow dyes, which meet all of these requirements.

Aqueous dye-based inks for high-quality, photo-realistic, ink jet printing require water-soluble dyes with excellent color and high light- and water-fastness. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy.

U.S. Pat. Nos. 5,851,274 and 5,810,916 disclose inks containing water soluble dyes including Acid Yellow 23 (tartrazine) and Acid Yellow 17. While these have excellent yellow color and water solubility, there is a problem with these dyes in that they have poor light stability.

Japanese Patent Application JP09-143411 discloses oil-soluble dyes including Diaresin Yellow L3G (Solvent Yellow 93), a monomethine oxonol dye (structure below) for use in "water-thinned" ink jet inks. However, these dyes have limited utility because of their very low water solubility.

U.S. Pat. No. 5,723,272 discloses the use of monomethine oxonol dyes as a filter dyes in photographic elements and European Patent Application No. 802065 discloses water insoluble monomethine oxonol dyes for use as image dyes in thermal transfer imaging. However, their use in ink jet inks is not disclosed.

It is the object of this invention to provide bright, readily water-soluble and light stable yellow monomethine oxonol dyes useful for aqueous ink jet printing.

SUMMARY OF THE INVENTION

This and other objects are achieved in accordance with this invention which relates to an ink jet ink composition comprising water, a humectant and a water-soluble monomethine oxonol dye.

It has been found that certain monomethine oxonol yellow dyes offer a combination of color, water solubility and light stability superior to the yellow dyes of the prior art.

DETAILED DESCRIPTION OF THE INVENTION

In a preferred embodiment of the invention, the monomethine oxonol dyes employed in the invention may be represented by the following structure:

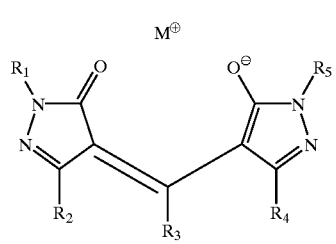

wherein
$R_1$ and $R_5$ each independently represents hydrogen, a substituted or unsubstituted alkyl group of 1–6 carbon atoms, a substituted or unsubstituted allyl group, a substituted or unsubstituted aryl group of 6–10 carbon atoms, a substituted or unsubstituted heteroaryl group of 5–10 atoms or a polyoxyalkylene group of 2–20 alkylene oxide residues;

$R_2$, $R_3$ and $R_4$ each independently represents the same groups listed above for $R_1$ and $R_5$, halogen, cyano, carboxy, acyl, sulfo, a substituted or unsubstituted alkoxy group of 1–6 carbon atoms, a substituted or unsubstituted alkoxy- or aryloxy-carbonyl group of 1–10 carbon atoms, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, ureido, sulfonylamino, amino, or a substituted or unsubstituted alkyl-, aralkyl-, aryl-, diaryl- or dialkyl-amino group of 1–20 carbon atoms;

M+ represents $H^+$ or a monovalent cation;

with the proviso that at least one of $R_1$, $R_2$, $R_3$, $R_4$ or $R_5$ must contain at least one group capable of imparting water solubility at a pH of about 4–9.

In a preferred embodiment of the invention, $R_1$ and $R_5$ in the above formula each independently represents 4-carboxyphenyl, 4-sulfophenyl, 3-sulfophenyl, 2-sulfophenyl or 2,5-disulfophenyl. In another preferred embodiment, $R_2$ and $R_4$ in the above formula each independently represents hydrogen or acyl. In another preferred embodiment, $R_3$ represents hydrogen.

In the above definition, examples of a substituted or unsubstituted alkyl group include methyl, ethyl, isopropyl, hydroxyethyl, 3-sulfopropyl and m-carboxybenzyl. Examples of a substituted or unsubstituted allyl group include cinnamyl, allyl and methallyl. Examples of a substituted or unsubstituted aryl group include phenyl, naphthyl, 3,5-biscarboxyphenyl and 4-sulfophenyl. Examples of a substituted or unsubstituted heteroaryl group include pyridyl, imidazolyl and quinolyl. Examples of a polyoxyalkylene group of 2–20 alkylene oxide residues include 3,6,9-trioxadecyl, 11-hydroxy-3,6,9-trioxa-5,8-dimethyldodecyl and 11-hydroxy-3,6,9-trioxaundecyl. Examples of halogen include chloro, fluoro, bromo and iodo. Examples of an acyl group include acetyl and benzoyl. Examples of a substituted or unsubstituted alkoxy group include methoxy, 3-carboxypropoxy and 2-hydroxyethoxy. Examples of a substituted or unsubstituted alkoxy- or aryloxy-carbonyl group of 1–10 carbons include methoxycarbonyl, ethoxycarbonyl, 2-methoxyethoxycarbonyl and 3-sulfophenoxycarbonyl. Examples of a substituted or unsubstituted alkyl- aralkyl-, aryl-, diaryl-or dialkyl carbamoyl group include N-methylcarbamoyl, N-methyl-N-4-sulfophenyl-carbamoyl, N,N-bis(4-carboxyphenyl)carbamoyl. Examples of a substituted or unsubstituted alkyl- aralkyl-, aryl-, diaryl- or dialkyl sulfamoyl group include N-methylsulfamoyl, N-methyl-N-phenyl-sulfamoyl, N-(p-sulfophenyl)sulfamoyl and N,N-bis(4-carboxyphenyl)sulfamoyl. Examples of an acylamino group include acetamido, methoxyethylacetamido and 3-carboxybenzamido. Examples of a ureido group include N-methylureido, ureido and N,N'-dimethylureido. Examples of a sulfonylamino group include methanesulfonamido, p-toluenesulfonamido and 2-sulfatoethanesulfonamido. Examples of a substituted or unsubstituted alkyl- aralkyl-, aryl- diaryl- or dialkylamino group include methylamino, N,N-dimethylamino, methoxyethylamino and 3-sulfoanilino.

Examples of monovalent cations described above ($M^+$) include sodium, potassium, ammonium, lithium, pyridinium, triethylammonium and triethanolammonium.

Examples of groups capable of imparting water solubility at a pH of about 4–9 include sulfonic, sulfinic, phosphonic, phosphoric and carboxylic acid moieties and salts thereof.

The dyes employed in the invention are not new and may be prepared by the methods disclosed in European Patent Application 665271.

Representative examples of the monomethine oxonol dyes of this invention are listed below.

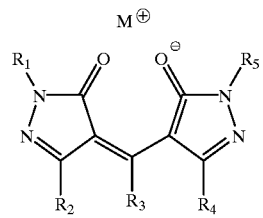

| Dye | $R_1$ | $R_2$ | $R_3$ | M | λ-max[1] |
|---|---|---|---|---|---|
| 1 | 4-($CO_2H$)phenyl | $CH_3$ | H | H | 434 |
| 2 | 3-($SO_3^-K^+$)phenyl | $CH_3$ | H | K | 434 |
| 3 | 4-($SO_3^-K^+$)phenyl | $CH_3$ | H | H | 435 |
| 4 | 2-methyl-4-($SO_3^-K^+$)-5-($SO_3^-K^+$)phenyl | $CH_3$ | H | Na | 435 |
| 5 | 2-methyl-4-($SO_3^-K^+$)-5-($SO_3^-K^+$)phenyl | $COCH_3$ | $CH_3$ | Na | 478 |
| 6 | 2-($SO_3^-K^+$)phenyl | $CH_3$ | H | K | 435 |

[1]Measured in 5% triethanolamine in water

Other dyes within the scope of this invention include:

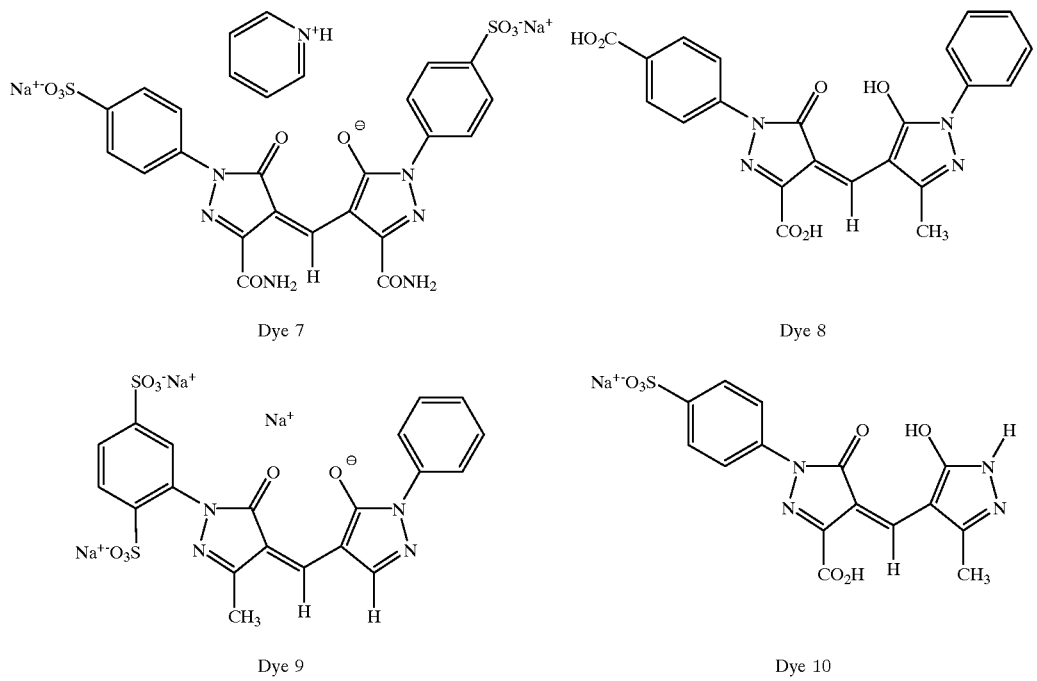

Dye 7

Dye 8

Dye 9

Dye 10

In general, the above dyes comprise from about 0.2 to about 5%, preferably from about 0.5 to about 3% by weight of the ink jet ink composition.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

The following control dyes were evaluated as comparative examples:

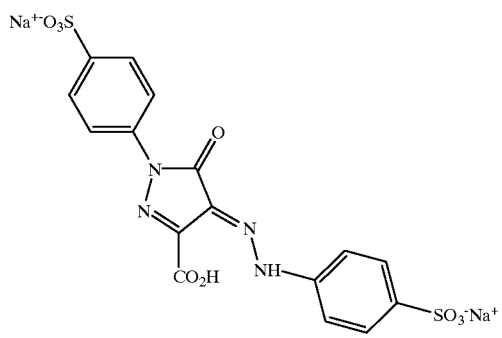

Dye C-1
Acid Yellow 23
λ-max = 414 (in 1% triethanolamine)
obtained in a preformulated aqueous ink from Lyson as Lyson Novajet Yellow ink

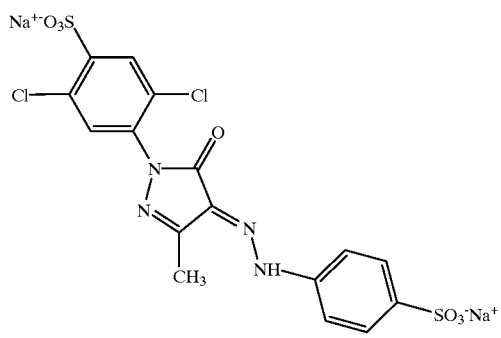

Dye C-2
Acid Yellow 17
λ-max = 394 (in 1% triethanolamine)
obtained as a water solution from Crompton and Knowles as Intrajet Yellow A2G

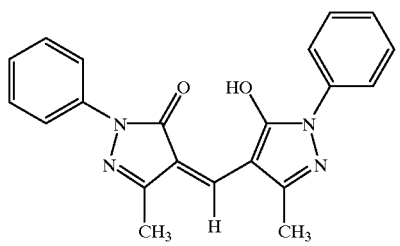

Dye C-3
Solvent Yellow 93

Preparation of Inks

Inks containing the dyes of the invention and control dyes were prepared by dissolving an appropriate amount of the dye in deionized water containing humectants of diethylene glycol and glycerol, each at 6 wt. %, a biocide, Proxel GXL® at 0.003 wt. % and a surfactant, Surfynol 465® (Air Products Co.) at 0.5 wt. %. Triethanolamine was added in some cases to solubilized the dye and/or to adjust the pH to approximately 8. The dye concentrations were based on solution absorption spectra and chosen such that the final ink, when diluted 1:1000, would yield a transmission optical density of approximately 1.0. Details are given in the Table below.

TABLE 1

| Ink | Dye | Wt. % Dye | Wt. % Triethanolamine |
|---|---|---|---|
| 1 | 1 | 1.5 | 2.6 |
| 2 | 2 | 2.2 | 0.8 |
| 3 | 3 | 2.5 | 0 |
| 3a | 3 | 2.5 | 2 |
| 4 | 4 | 3.4 | 1.4 |
| 5 | 5 | 3.2 | 0 |
| 6 | 6 | 2.5 | 0 |
| C-1 | C-1 | * | * |
| C-2 | C-2 | 12.2** | 0 |
| C-3 | C-3 | Dye could not be dissolved even with excess triethanolamine | |

*Lyson Novajet Yellow ink having a pH of approximately 7 and containing approximately 7% glycerol
**Intrajet Yellow A2G, obtained from Crompton and Knowles, a water solution of Acid Yellow 17

Printing of Test Images

The above inks were then filtered through a 0.45μ polytetrafluoroethylene filter and placed in a clean Hewlett-Packard ink cartridge No. HP 51629A and fitted into the black ink station of a Hewlett-Packard DeskJet 600® printer. A test image consisting of a series of 21 variable density patches, approximately 15 by 13 mm in size, ranging from 5% dot coverage to 100% dot coverage was printed onto commercially-available Kodak Inkjet Photographic Quality paper, Catalog No. 899-9161, and allowed to dry for 24 hours at ambient temperature and humidity.

Evaluation of Test Images

The Status A red, green and blue reflection densities of the maximum patch of the above stepped images were measured using an X-Rite® 820 densitometer. The D-max blue density is listed in Table 2.

The stepped images were then subjected to light fade under 50 Klux high-intensity daylight irradiation and 50% relative humidity conditions for 1 week. The Status A blue densities of the stepped images were remeasured and the % loss in Status A blue density for the D-max patches was calculated. Smaller losses represent more stable dyes and are preferred.

TABLE 2

| Ink | Blue D-max | % Loss Light Fade |
|-----|------------|-------------------|
| 1   | 1.7        | 16                |
| 2   | 1.7        | 21                |
| 3   | 1.7        | 44                |
| 3a  | 1.9        | 43*               |
| 4   | 1.5        | 11                |
| 5   | 1.2        | 39                |
| 6   | 1.3        | 9                 |
| C-1 | 1.3        | 72                |
| C-2 | 1.2        | 62                |

*Faded for 2 weeks

The above data show that the dyes of the invention are much more light stable than Acid Yellows 23 and 17 (C-1 and C-2) of the prior art. The dyes of the invention also gives good density.

The invention has been described in detail with particular reference to certain preferred embodiments thereof, but it will be understood that variations and modifications can be effected within the spirit and scope of the invention.

What is claimed is:

1. An ink jet ink composition comprising water, a humectant and a water-soluble oxonol dye, said dye comprising about 0.2 to about 5% by weight of said composition.

2. The composition of claim 1 wherein said monomethine oxonol dyes may be represented by the following structure:

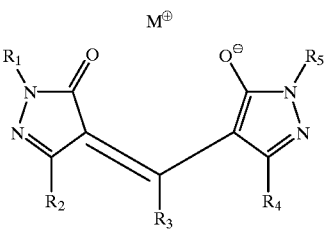

I wherein:
$R_1$ and $R_5$ each independently represents hydrogen, a substituted or unsubstituted alkyl group of 1–6 carbon atoms, a substituted or unsubstituted allyl group, a substituted or unsubstituted aryl group of 6–10 carbon atoms, a substituted or unsubstituted heteroaryl group of 5–10 atoms or a polyoxyalkylene group of 2–20 alkylene oxide residues;

$R_2$, $R_3$ and $R_4$ each independently represents the same groups listed above for $R_1$ and $R_5$, halogen, cyano, carboxy, acyl, sulfo, a substituted or unsubstituted alkoxy group of 1–6 carbon atoms, a substituted or unsubstituted alkoxy- or aryloxy-carbonyl group of 1–10 carbon atoms, carbamoyl, a substituted or unsubstituted alkyl-, aralkyl-, aryl-, diaryl- or dialkyl-carbamoyl group of 1–20 carbon atoms, ureido, sulfamoyl, a substituted or unsubstituted alkyl-, aralkyl-, aryl-, diaryl- or dialkyl-sulfamoyl group of 1–20 carbon atoms, acylamino, sulfonylamino, amino, or a substituted or unsubstituted alkyl-, aralkyl-, aryl-, diaryl- or dialkyl-amino group of 1–20 carbon atoms;

M+ represents $H^+$ or a monovalent cation;

with the proviso that at least one of $R_1$, $R_2$, $R_3$, $R_4$ or $R_5$ must contain at least one group capable of imparting water solubility at a pH of about 4–9.

3. The composition of claim 2 wherein $R_1$ and $R_5$ in the above formula each independently represents 4-caboxyphenyl, 4-sulfophenyl, 3-sulfophenyl, 2-sulfophenyl or 2,5-disulfophenyl.

4. The composition of claim 2 wherein $R_2$ and $R_4$ in the above formula each independently represents hydrogen or acyl.

5. The composition of claim 2 wherein $R_3$ represents hydrogen.

6. The composition of claim 1 wherein said humectant is diethylene glycol, glycerol or diethylene glycol monobutylether.

* * * * *

UNITED STATES PATENT AND TRADEMARK OFFICE
CERTIFICATE OF CORRECTION

PATENT NO.    : 6,136,079
DATED         : October 24, 2000
INVENTOR(S)   : Steven Evans et al.

It is certified that error appears in the above-identified patent and that said Letters Patent is hereby corrected as shown below:

<u>Column 9,</u>
Line 44, after "soluble" insert -- monomethine --

Signed and Sealed this

Sixteenth Day of July, 2002

Attest:

Attesting Officer

JAMES E. ROGAN
Director of the United States Patent and Trademark Office